Jan. 9, 1968  J. R. HUYGE  3,362,746
ADJUSTABLE DRIVER'S SEAT FOR COMMERCIAL VEHICLES
Filed June 13, 1966  4 Sheets-Sheet 1

INVENTOR.
JOHN R. HUYGE
BY
ATTY.

Jan. 9, 1968          J. R. HUYGE          3,362,746

ADJUSTABLE DRIVER'S SEAT FOR COMMERCIAL VEHICLES

Filed June 13, 1966          4 Sheets-Sheet 2

INVENTOR.
JOHN R. HUYGE

BY

ATTY.

Jan. 9, 1968  J. R. HUYGE  3,362,746
ADJUSTABLE DRIVER'S SEAT FOR COMMERCIAL VEHICLES
Filed June 13, 1966  4 Sheets-Sheet 3
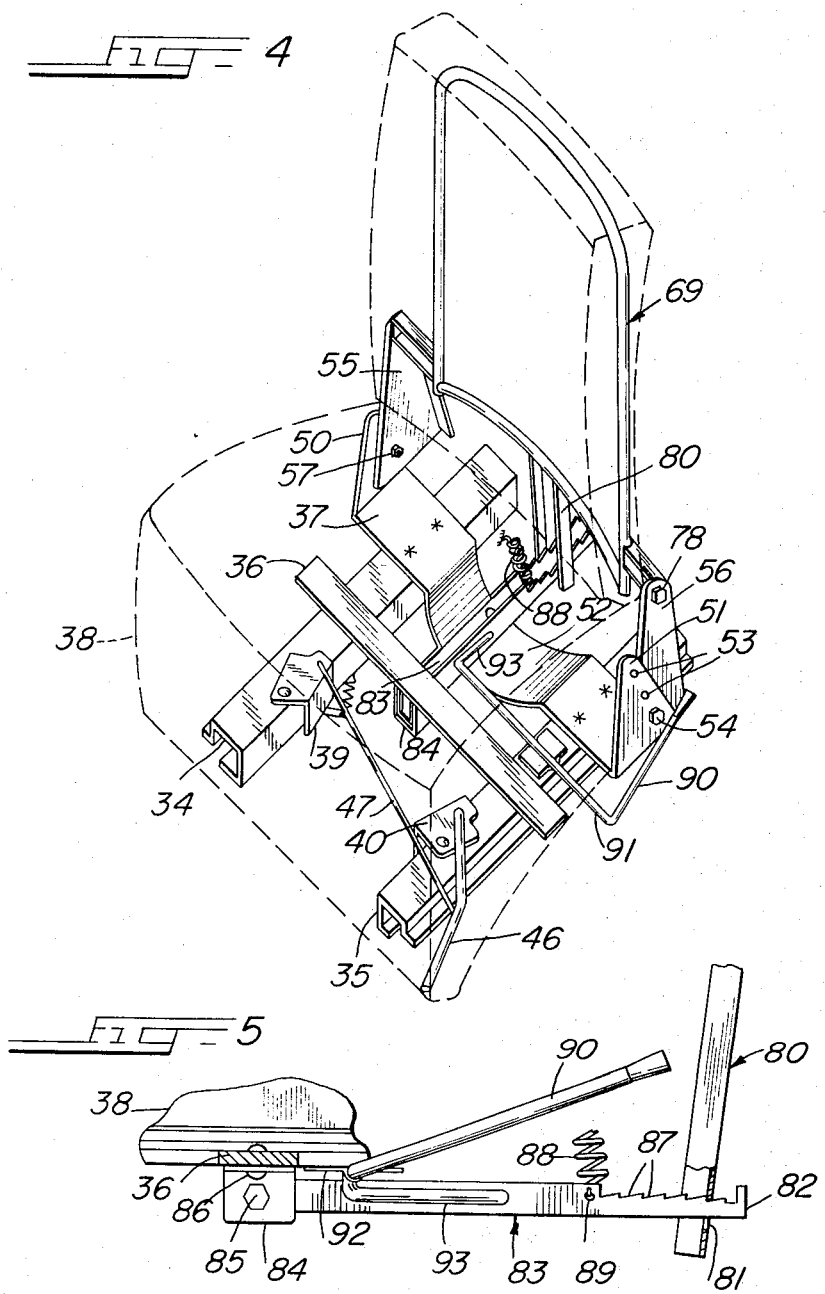
INVENTOR.
JOHN R. HUYGE Jan. 9, 1968 J. R. HUYGE 3,362,746
ADJUSTABLE DRIVER'S SEAT FOR COMMERCIAL VEHICLES
Filed June 13, 1966 4 Sheets-Sheet 4
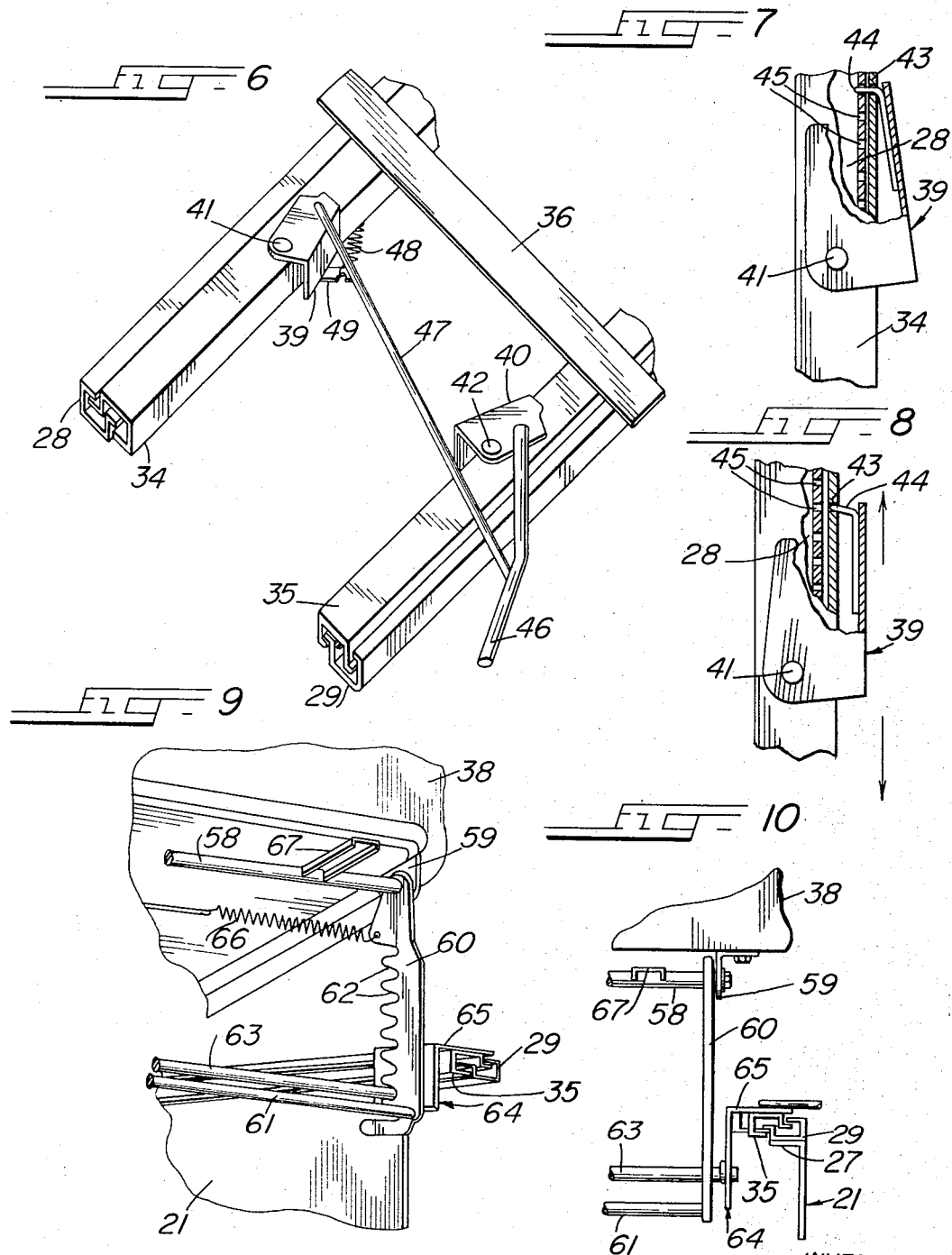
INVENTOR.
JOHN R. HUYGE
ATTY.

United States Patent Office 3,362,746
Patented Jan. 9, 1968

3,362,746
ADJUSTABLE DRIVER'S SEAT FOR
COMMERCIAL VEHICLES
John R. Huyge, 1931 Jefferson Ave. SE.,
Grand Rapids, Mich. 49507
Filed June 13, 1966, Ser. No. 557,028
5 Claims. (Cl. 297—313)

ABSTRACT OF THE DISCLOSURE

An adjustable vehicle seat with a fixed base and interengaged rails connecting the seat to the base, with relative front-rear movement between the rails locked by a movable detent mounted on the rails at opposite sides of the structure, the seat also providing a variable fulcrum support for a back frame carrying a vertically shiftable back, the back frame being stabilized about the fulcrum by an arm extending below the level of the seat to engage a notched lever pivoting on a transverse axis under the seat, and controlled by a torsion bar.

---

This invention relates to the construction of driver's seats for commercial vehicles. The correct placement of the driver with respect to the control of the vehicle must be combined with comfort in order to maintain the alertness of the driver over long periods. The several standard adjustments of seat pitch, height, back angle, and front-rear position are preferably arranged so that alterations can be made by the seat occupant without leaving his driving position, and preferably with one hand. The present invention, in the interest of economy, has provided for the alteration of seat height with a structure requiring removal and re-attachment of fastenings, but the remaining variables of seat position are secured by latch devices having controls that are easily manipulated from the driver's position. The degree of adjustability is provided in conjunction with a back structure which is movable with the vertical movement of the driver which results from the spring action of the seat. The general principle of a vertically-shiftable back (to prevent a scrubbing action on the clothing of the driver) is not broadly new. This invention, however, incorporates this feature in a structure directed primarily at obtaining the necessary seat adjustments at a minimum of cost.

The several features of the invention will be analyzed in detail through a discussion of the particular embodiments illustrated in the accompanying drawings. In the drawings:

FIGURE 4 is a perspective view of the movable framework carrying the seat and back units.

FIGURE 5 is a sectional elevation on an enlarged scale showing the latch mechanism for maintaining the adjusted position of the back.

FIGURE 6 is an enlarged fragmentary perspective view showing the details of the latch mechanism for securing the front-rear adjustment.

FIGURE 7 is an enlarged fragmentary section showing the locked condition of the mechanism illustrated in FIGURE 6, at one side of the device.

FIGURE 8 shows the mechanism of FIGURE 7 in the unlocked condition.

FIGURE 9 is a perspective view of the underside of the seat, showing the mechanism for maintaining the adjusted pitch of the seat.

FIGURE 10 is a front elevation of a portion of the structure shown in FIGURE 9.

Figure 1:
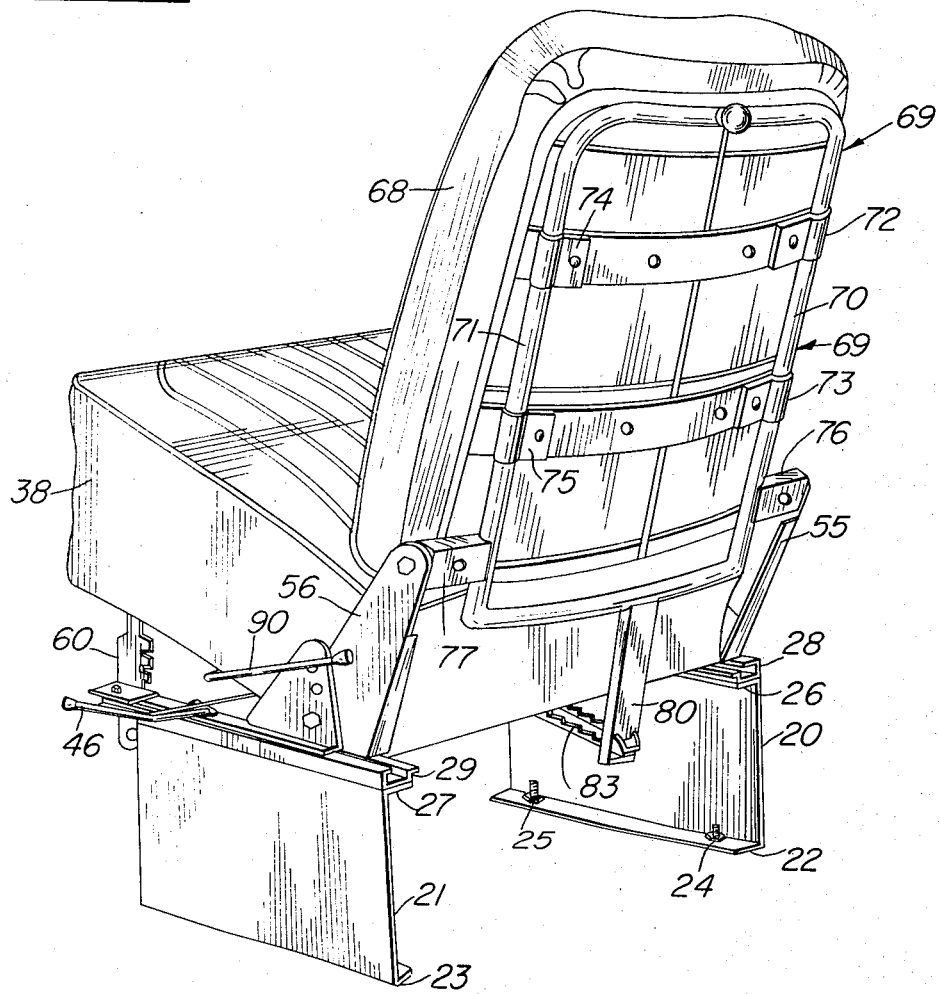
FIGURE 1 is a rear perspective view of an assembled seat embodying the present invention.
Figure 2:
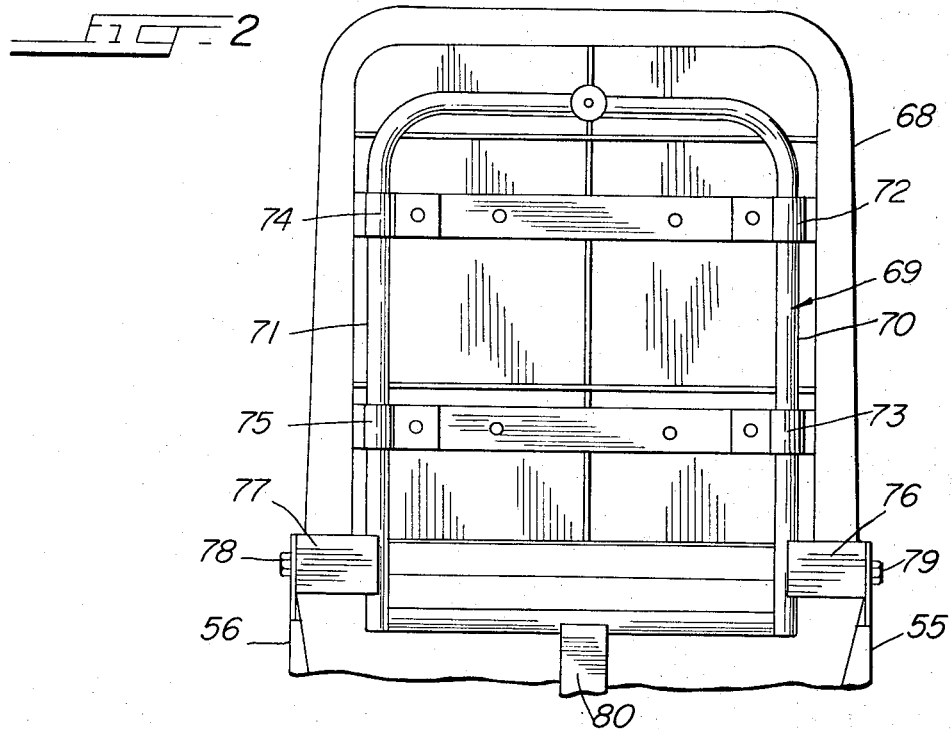
FIGURE 2 is a rear elevation of the upper portion of the seat and back structure shown in FIGURE 1.
Figure 3:
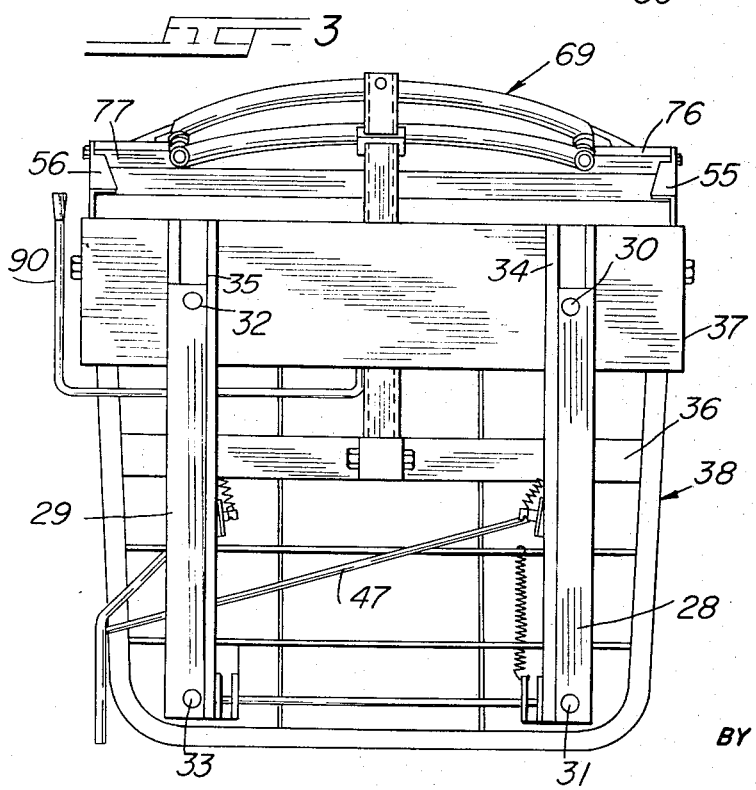
FIGURE 3 is a bottom view of the unit shown in FIGURE 1, shown detached from the base support.

The complete seat structure shown in FIGURE 1 is shown mounted on a supporting base formed by the opposite channels 20 and 21. The lower flanges 22 and 23 of these channels are secured to the floor structure (not shown) of the vehicle by bolts as shown at 24 and 25 engaging the flange 22, with similar bolts also engaging the flange 23. The top flanges 26 and 27 support the fixed rails 28 and 29, respectively, with the rails being bolted to the flanges at convenient points as shown at 30–33 in FIGURE 3.

The inner rails 34 and 35 are interengaged with the outer rails as best shown in FIGURE 10, and are slidable with respect to the outer rails. The sliding movement can be rendered more smooth by the presence of rollers (not shown) disposed to transfer load between the inner and the outer rails in the manner of a drawer guide. The transverse beam 37 is secured to the inner rails 34 and 35 to provide a support for the seat unit 38. The attachment of this beam to the rails may be by any convenient arrangement, such as spot welding or by screw fastenings. The result of the attachments is to provide a framework movable in a front-rear direction for supporting the seat unit. The seat unit itself is of conventional upholstered construction, which forms no part of the present invention.

FIGURES 6, 7, and 8 illustrate the details of the latch mechanism which maintains the adjusted front-rear position by blocking relative movement between the inner and outer rails. A pair of dogs 39 and 40 are pivotally mounted on the inner rails 34 and 35, respectively, at the pivot pins 41 and 42. The inner rails 34 and 35 are each provided with an opening as shown at 43 in FIGURES 7 and 8 which are traversed by the projections 44 mounted on the dogs 39 and 40. The outer rails 28 and 29 have a series of openings 45 which are also adapted to receive the projections 44. This construction results in a possibility that the projections 44 can become interengaged with both the inner and outer rails at selected front-rear positions, as shown in FIGURE 7. Rotation of the dogs about their pivot points to the position shown in FIGURE 8 results in disengagement of the projections from the openings 45, with the consequent freedom of the inner rails to move with respect to the outer rails. The latch mechanism may be released by manipulation of the handle 46, which is secured (as by welding) to the dog 40. Movement of the handle 46 is communicated to the dog 39 by the interconnecting link 47. A spring 48 extending from a convenient point of attachment on the inner rail 34 to the ear 49 on the dog 39 tends to bias the dogs 39 and 40 to the locked condition shown in FIGURE 7. This spring can be placed on both dogs, if desired.

The transverse beam 37 terminates at its opposite ends in the vertical members 50 and 51. Preferably, the beam 37 is integral with these members, which are formed by simply bending the material of the beam from an initially flat condition. The central portion 52 of the beam is rendered concave, as shown in FIGURE 4, to provide clearance for the remainder of the structure. The members 50 and 51 function as support brackets for the seat, and are each provided with a group of vertically-spaced holes as shown at 53. Bolts as shown at 54 traverse the members 50 and 51, and also enter the side plates 55 and 56, which are secured to the seat unit 38. Preferably, the side plates are either provided with threaded holes, or with welded nuts as shown at 57 in FIGURE 4 for receiving the bolts 54. When installed, the bolts 54 function as fulcra for the rear portion of the seat. Installation of the bolts in selected opposite holes of the group shown at 53 results in placement of the rear portion of the seat at various elevations.

The attitude of the seat is controlled at the front by the mechanism shown in FIGURES 9 and 10. A shaft 58 is pivotally supported at its opposite ends in the brackets 59 secured to the framework of the seat 38. The links 60 are secured to the shaft 58, and are also interconnected by the rod 61. Serrations 62 in the links 60 are engageable with the fixed rod 63 which functions as an abutment as a result of being secured to the vertical flange of the angle members 64, the horizontal portions 65 of which are secured to the moving inner rails 34 and 35. A spring 66 extends between the links 60 and a convenient point of attachment on the seat 38 to urge the links into engagement with the abutment rod 63. The links can be disengaged from the rod 63 either by grasping the cross rod 61, or by applying downward pressure manually against the tab 67 secured to the shaft 58. When the links are disengaged from the abutment rod 63, the front of the seat becomes vertically adjustable to alter the pitch about the axis of the bolts 54.

The back unit 68 is vertically movable on the frame 69. This frame is a generally square configuration of steel tubing, in the preferred form of the invention, with the opposite side sections 70 and 71 serving as guide rails for the bearing clips 72–75 secured to the structure of the seat unit 68. These bearing clips provide for a sliding vertical movement of the seat with respect to the frame, to accommodate the jostling of the driver as the vehicle moves over rough roads. The frame 69 is provided with the lateral extensions 76 and 77, which are preferably box-like structures of sheet metal, and are pivotally secured to the side plates 55 and 56 of the seat by bolts as shown at 78 and 79. The downward extension 80 secured to the frame 69 contains an opening 81 receiving the end 82 of a latch beam 83 pivotally mounted in the bracket 84 on the bolt 85. This bracket is secured to the transverse member 36 of the seat 38 by any convenient arrangement, such as the rivets shown at 86 in FIGURE 5. The serrations 87 are engageable with the material of the extension 80 at the upper extremity of the opening 81 under the urging of spring 88, which extends between a suitable connection on the seat structure 38 and the connecting hole 89 on the lever 83. The handle 90 is disposed at the side of the seat, and is provided with a torsion bar portion 91 which is pivotally received in the bracket 92 secured to the underside of the seat 38. The torsion bar portion 91 of the handle terminates in the rearward extension 93 which is welded to the lever 83. A downward push on the lever 90 will result in clockwise rotation of the lever 83, and disengagement of the teeth 87 from the member 80, thus freeing the back for rotation about the axis of the bolts 78 and 79. It is preferable that the teeth 87 be inclined so that the back can be pulled into a more nearly vertical position without the manipulation of the handle 90. The concave offset in the transverse beam 37 is provided to accommodate the movement of the beam 83.

The particular embodiments of the present invention which have been illustrated and discussed herein are for illustrative purposes only and are not to be considered as a limitation upon the scope of the appended claims. In these claims, it is my intent to claim the entire invention disclosed herein, except as I am limited by the prior art.

I claim:
1. An adjustable vehicle seat, comprising:
a base structure including spaced parallel guideway rails;
a carrier rail mounted for movement in each of said guideway rails;
a pivot bracket fixed with respect to said carrier rails, and including fulcrum means engageable with said pivot bracket in a plurality of vertical positions with respect thereto;
a seat having opposite side members disposed adjacent the rear of said seat, and normally engaging said fulcrum means;
a back having a frame provided with portions pivotally connected to said side members, and also having a depending arm extending downward behind and below the level of the underside of said seat;
a lever pivotally mounted on said seat for rotation on a transverse axis below said seat, said lever having the rear portion thereof provided with notches engageable with said depending arm to position said back about the pivotal connection thereof;
an abutment member fixed with respect to said carrier rails;
link means pivotally mounted on the underside of the front of said seat on a transverse axis; and engageable with said abutment member at a plurality of positions to determine the angle of inclination of said seat about said fulcrum pins; and
latch means interengageable between said carrier rails and base structure to position said carrier rails along said guideway rails.

2. A vehicle seat as defined in claim 1, including a control member for said lever, said control member having a transverse torsion bar portion secured at the inner end thereof to said lever, the outer end of said torsion bar portion being rotatably secured to said seat, said control member also having a handle extending from the outer extremity of said torsion bar.

3. A vehicle seat as defined in claim 1, wherein said latch means is pivotally mounted on said carrier rails for limited rotation on a vertical axis, and said guideway rails have serrated portions, said latch means being interconnected by a link rod engageable with said serrated portions through apertures in said carrier rails.

4. A vehicle seat as defined in claim 3 wherein said carrier rails are interengaged with said guideway rails so that said carrier rails have portions embracing said guideway rail serrated portions.

5. A vehicle seat as defined in claim 4, wherein said apertures are disposed in said embracing portions, and said embracing portions are disposed at the side of said carrier rails, said latch means including latch members pivotally mounted on the top of said carrier rails, and also including a handle secured to one of said latch members, and said link rod induces opposite rotation of said latch members.

References Cited

UNITED STATES PATENTS

| 1,703,004 | 2/1929 | Hellstand | 297—313 |
| 2,221,268 | 11/1940 | Sears | 297—313 X |
| 2,355,762 | 8/1944 | Van Derveer | 297—313 |
| 2,367,829 | 1/1945 | Shinn | 297—313 |
| 2,638,150 | 5/1953 | May | 297—313 |
| 2,646,839 | 7/1953 | Hillman | 297—313 |
| 2,855,026 | 10/1958 | Simons et al. | 297—355 X |

BOBBY R. GAY, *Primary Examiner.*

DAVID J. WILLIAMOWSKY, *Examiner.*

G. O. FINCH, *Assistant Examiner.*